(12) United States Patent
Takahashi et al.

(10) Patent No.: US 9,500,343 B2
(45) Date of Patent: Nov. 22, 2016

(54) LIGHT SOURCE DEVICE, LIGHTING DEVICE, VEHICULAR HEADLIGHT, AND VEHICLE

(75) Inventors: Koji Takahashi, Osaka (JP); Yoshiyuki Takahira, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 11 days.

(21) Appl. No.: 13/556,993

(22) Filed: Jul. 24, 2012

(65) Prior Publication Data

US 2013/0027962 A1    Jan. 31, 2013

(30) Foreign Application Priority Data

Jul. 25, 2011   (JP) .................................. 2011-162604

(51) Int. Cl.
| | |
|---|---|
| *F21S 2/00* | (2016.01) |
| *F21V 9/16* | (2006.01) |
| *F21S 8/10* | (2006.01) |
| *F21Y 101/02* | (2006.01) |

(52) U.S. Cl.
CPC .............. *F21V 9/16* (2013.01); *F21S 48/1145* (2013.01); *F21S 48/1225* (2013.01); *F21S 48/1241* (2013.01); *F21Y 2101/025* (2013.01)

(58) Field of Classification Search
CPC ...................... F21S 48/215; F21S 48/10; F21S 48/1131; F21S 48/11; F21S 48/1323; F21S 48/1341; F21S 48/1145; F21S 48/115
USPC ................................ 362/545, 547, 507–510
See application file for complete search history.

(56) References Cited

U.S. PATENT DOCUMENTS

| | | |
|---|---|---|
| 3,267,278 A | 8/1966 | Doolittle |
| 4,654,761 A | 3/1987 | Walsh |
| 5,178,446 A | 1/1993 | Gruber et al. |
| 6,412,971 B1 * | 7/2002 | Wojnarowski et al. ...... 362/241 |
| 7,188,984 B2 * | 3/2007 | Sayers et al. ................. 362/545 |
| 2001/0017970 A1 | 8/2001 | Shie et al. |
| 2004/0208018 A1 | 10/2004 | Sayers et al. |
| 2005/0057917 A1 | 3/2005 | Yatsuda et al. |
| 2005/0105301 A1 | 5/2005 | Takeda et al. |

(Continued)

FOREIGN PATENT DOCUMENTS

| | | |
|---|---|---|
| CN | 101680992 | 3/2010 |
| EP | 1 780 462 | 5/2007 |

(Continued)

OTHER PUBLICATIONS

Extended Search Report dated Jul. 16, 2013, directed to European Application No. 12005390.5; 3 pages.

(Continued)

*Primary Examiner* — Sean Gramling
*Assistant Examiner* — Gerald J Sufleta, II
(74) *Attorney, Agent, or Firm* — Morrison & Foerster LLP

(57) ABSTRACT

A headlight system in accordance with the present invention includes: a semiconductor laser element that emits laser light; a light-emitting section that upon receipt of the laser light emitted from the semiconductor laser element, emits illumination light which is both the laser light and fluorescence obtained by wavelength conversion of a portion of the laser light; and a diffusion plate that mixes the laser light and fluorescence which are contained in the illumination light emitted by the light-emitting section.

11 Claims, 10 Drawing Sheets

(56) References Cited

U.S. PATENT DOCUMENTS

| | | | |
|---|---|---|---|
| 2007/0019415 A1 | 1/2007 | Leblanc et al. | |
| 2008/0089089 A1 | 4/2008 | Hama et al. | |
| 2009/0052189 A1 | 2/2009 | Kon | |
| 2010/0014296 A1 | 1/2010 | Chuang | |
| 2010/0128463 A1* | 5/2010 | Kim | F21S 48/1159 362/84 |
| 2010/0254115 A1 | 10/2010 | Wegh et al. | |
| 2011/0148280 A1* | 6/2011 | Kishimoto et al. | 313/483 |
| 2011/0157865 A1* | 6/2011 | Takahashi et al. | 362/84 |
| 2011/0204405 A1* | 8/2011 | Tsutsumi | F21S 48/1159 257/98 |
| 2011/0249460 A1* | 10/2011 | Kushimoto | B60Q 1/085 362/510 |
| 2012/0026721 A1* | 2/2012 | Kurt | F21K 9/56 362/84 |
| 2013/0010492 A1* | 1/2013 | Montgomery | F21K 9/52 362/553 |
| 2013/0114044 A1* | 5/2013 | Inoue et al. | 353/31 |

FOREIGN PATENT DOCUMENTS

| | | |
|---|---|---|
| EP | 2 180 232 | 4/2010 |
| EP | 2 461 090 | 6/2012 |
| FR | 2 669 991 | 6/1992 |
| JP | 2002-298615 | 10/2002 |
| JP | 2003-295319 | 10/2003 |
| JP | 2004-354495 | 12/2004 |
| JP | 2005-150041 | 6/2005 |
| JP | 2008-108553 | 5/2008 |
| JP | 2008-234908 | 10/2008 |
| JP | 2008-270229 | 11/2008 |
| JP | 2008-305802 | 12/2008 |
| WO | WO-2006/133214 | 12/2006 |
| WO | WO-2008/149250 | 12/2008 |
| WO | WO-2010/146516 | 12/2010 |

OTHER PUBLICATIONS

Communication of a Notice of Opposition dated Jun. 8, 2016, directed to EP Application No. 12005390.5; 105 pages.

* cited by examiner

LIGHT SOURCE DEVICE, LIGHTING DEVICE, VEHICULAR HEADLIGHT, AND VEHICLE

This Nonprovisional application claims priority under 35 U.S.C. §119(a) on Japanese Patent Application No. 2011-162604 filed on Jul. 25, 2011, the entire contents of which are hereby incorporated by reference.

TECHNICAL FIELD

The present invention relates to a light source device which obtains illumination light by mixing a plurality of light beams. More specifically, the present invention relates to a light source device which obtains visible light by mixing excitation light and light obtained by wavelength conversion of a portion of the excitation light so as to use the visible light as illumination light.

BACKGROUND ART

Conventionally, lighting devices using white light have been proposed. Such lighting devices include an LED or semiconductor laser element that emits laser light in a blue wavelength band (440 nm to 460 nm) as an excitation light source, and generate white light by exciting a phosphor contained in a light-emitting section and emitting fluorescence in a wavelength band ranging from a green wavelength band to a red wavelength band (e.g. YAG phosphor emitting yellow fluorescence) and mixing a blue component of the laser light and green to red components of the fluorescence. For example, lighting devices using a semiconductor laser element as an excitation light source are described in Patent Literatures 1 and 2.

CITATION LIST

Patent Literatures

Patent Literature 1
Japanese Patent Application Publication, Tokukai, No. 2004-354495 (Publication Date: Dec. 16, 2004)
Patent Literature 2
Japanese Patent Application Publication, Tokukai, No. 2008-108553 (Publication Date: May 8, 2008)

SUMMARY OF INVENTION

Technical Problem

However, when the light-emitting section is excited with laser light having directivity, fluorescence is emitted isotropically from the light-emitting section, whereas components of the laser light, not only components specular-reflected by the surface of the light-emitting section but also components temporarily entering the light-emitting section, are outputted from the light-emitting section while retaining their original directivities to some degree.

As a result, the problem occurs that the color of the illumination light significantly varies depending on a visual angle (viewing angle). For example, in a case where the light-emitting section including YAG phosphor which emits yellow light when excited by blue laser light, the resultant light appears to be bluish and yellowish depending on a viewing angle, thus causing color nonuniformity of the illumination light.

The present invention has been made to solve the problem, and an object of the present invention is to provide a light source device that produces illumination light with improved color uniformity by mixing excitation light and wavelength-converted light which is obtained by wavelength conversion of the excitation light.

Solution to Problem

In order to attain the object, a light source device in accordance with the present invention includes: an excitation light source that emits excitation light; a light-emitting section that, upon receipt of the excitation light emitted from the excitation light source, emits illumination light which is both the excitation light and wavelength-converted light obtained by wavelength conversion of a portion of the excitation light; and a light-mixing section that mixes the excitation light and the wavelength-converted light which are contained in the illumination light emitted by the light-emitting section.

According to the above arrangement, when the light-emitting section receives excitation light emitted from the excitation light source, the light-emitting section emits the excitation light and wavelength-converted light obtained by wavelength conversion of a portion of the excitation light, and the light source device emits both the excitation light and the wavelength-converted light as illumination light.

In order to irradiate a predetermined region of the light-emitting section, light having high directivity is generally used as excitation light. Therefore, some portion of the excitation light entering the light-emitting section is directly emitted from the light-emitting section without being subjected to wavelength conversion, and is released anisotropically with an angular distribution biased toward to a specific emission angle while retaining its original directivity.

Therefore, when the excitation light and the wavelength-converted light emitted from the light-emitting section are directly used as illumination light, the color of the illumination light varies depending on a viewing angle, causing color nonuniformity of the illumination light.

Accordingly, the light source device in accordance with the present invention includes the light-mixing section which mixes the excitation light and the wavelength-converted light emitted from the light-emitting section, and emits the excitation light and the wavelength-converted light mixed by the light-mixing section as illumination light. As described above, mixing the excitation light and the wavelength-converted light by means of the light mixing section enables the distribution of excitation light and wavelength-converted light contained in the illumination light to be more even than directly outputting the excitation light as the illumination light.

Thus, according to the above arrangement, it is possible to realize a light source device with improved color uniformity of illumination light.

Advantageous Effects of Invention

As described earlier, a light source device in accordance with the present invention includes: an excitation light source that emits excitation light; a light-emitting section that, upon receipt of excitation light emitted from the excitation light source, emits illumination light which is both the excitation light and wavelength-converted light obtained by wavelength conversion of a portion of the excitation light; and a light-mixing section that mixes the excitation light and the wavelength-converted light which are contained in the illumination light emitted by the light-emitting section.

Therefore, the present invention achieves the effect of providing a light source device with improved color uniformity of illumination light.

DESCRIPTION OF EMBODIMENTS

First Embodiment

The following description discusses a light source device in accordance with the first embodiment of the present invention with reference to FIGS. 1 to 4. The present embodiment discusses a case in which the light source device in accordance with the present invention is applied to a headlight system for a car. Note that the light source device in accordance with the present invention is also applicable to a headlight for a vehicle other than a car and other lighting devices.

[Arrangement of Headlight System 100]

Figure 1:
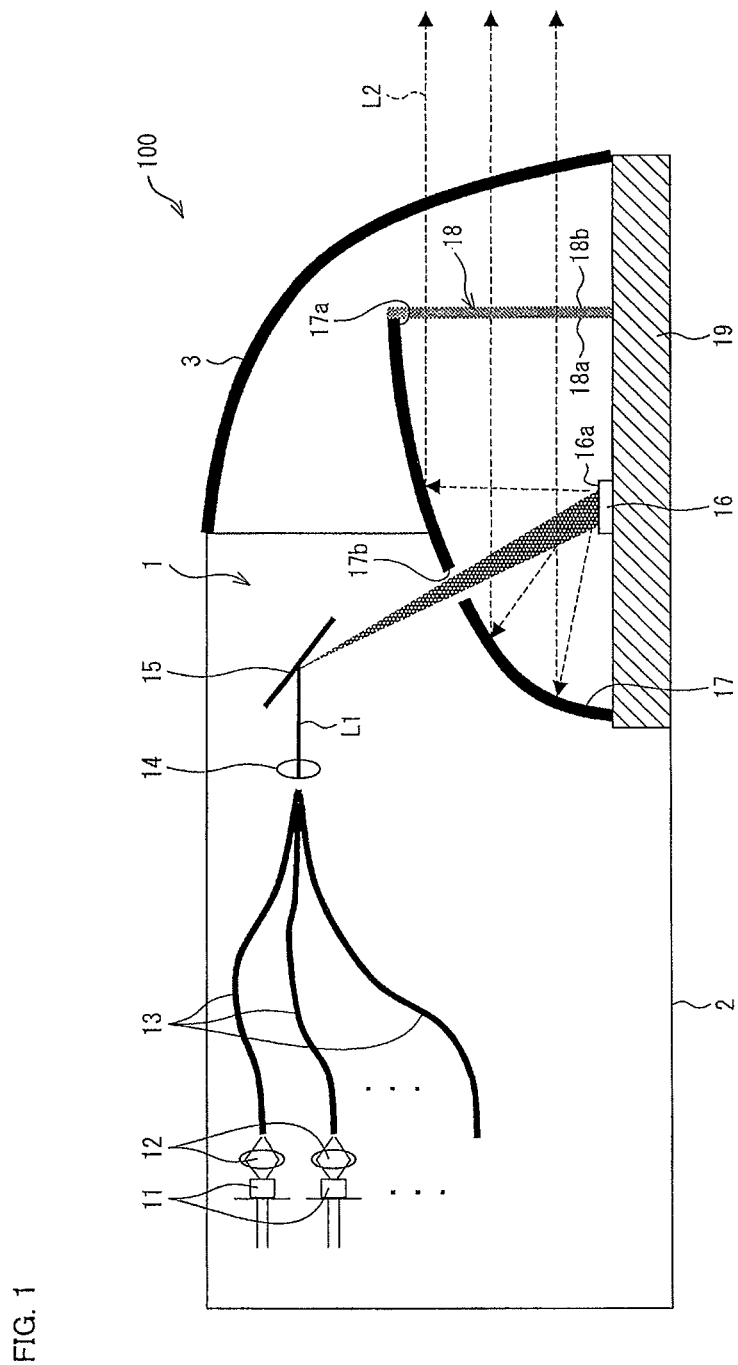
FIG. 1 is a cross-sectional view schematically showing the configuration of a headlight system in accordance with First Embodiment.
Figure 2:
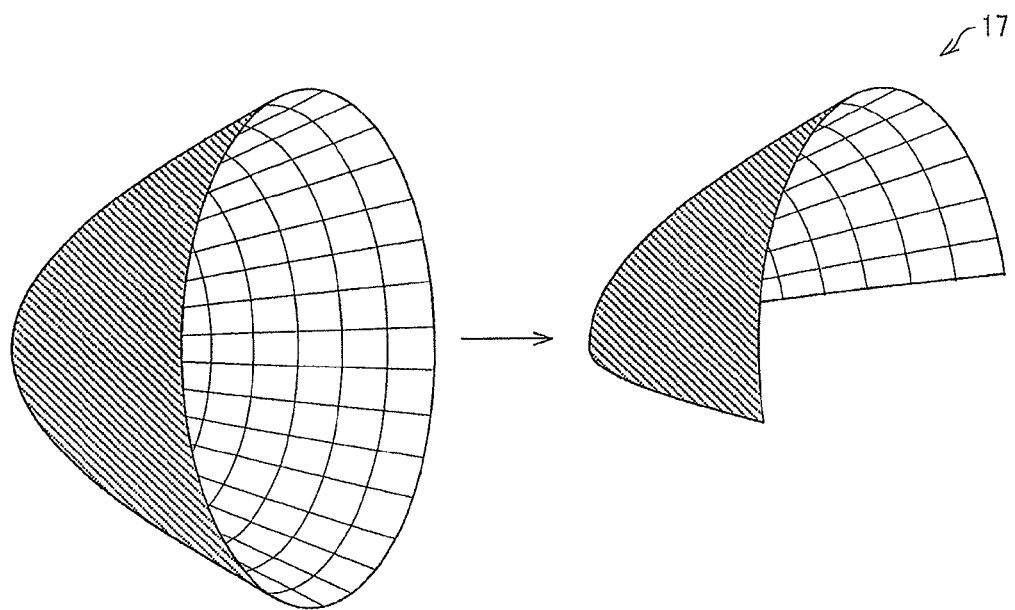
FIG. 2 is a conceptual diagram showing a paraboloid of revolution of a reflector illustrated in FIG. 1.
Figure 3:
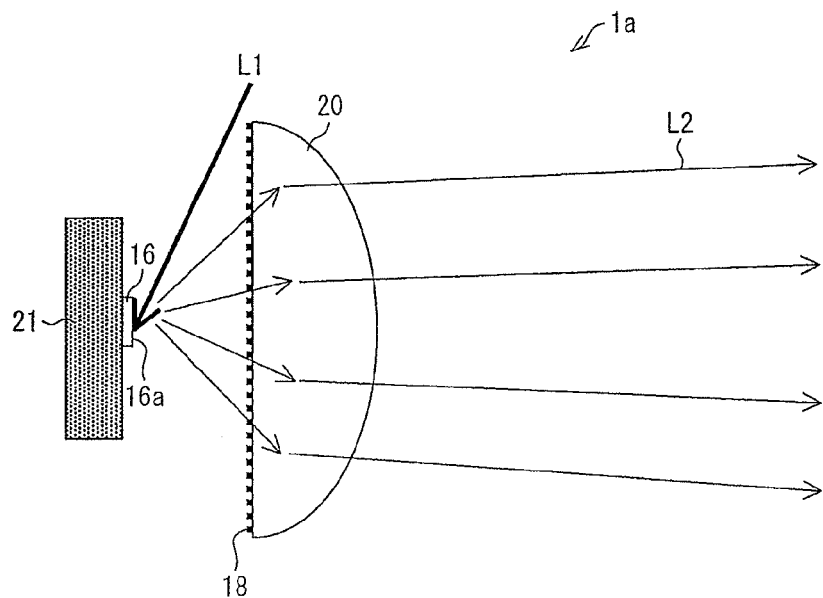
FIG. 3(a) is a cross-sectional view schematically showing the configuration of a light source device having a projector lens as a light projection member and shows a light source device having a reflective light-emitting section.
FIG. 3(b) is a cross-sectional view schematically showing the configuration of a light source device having a projector lens as a light projection member and shows a transmission light-emitting section.
Figure 3:
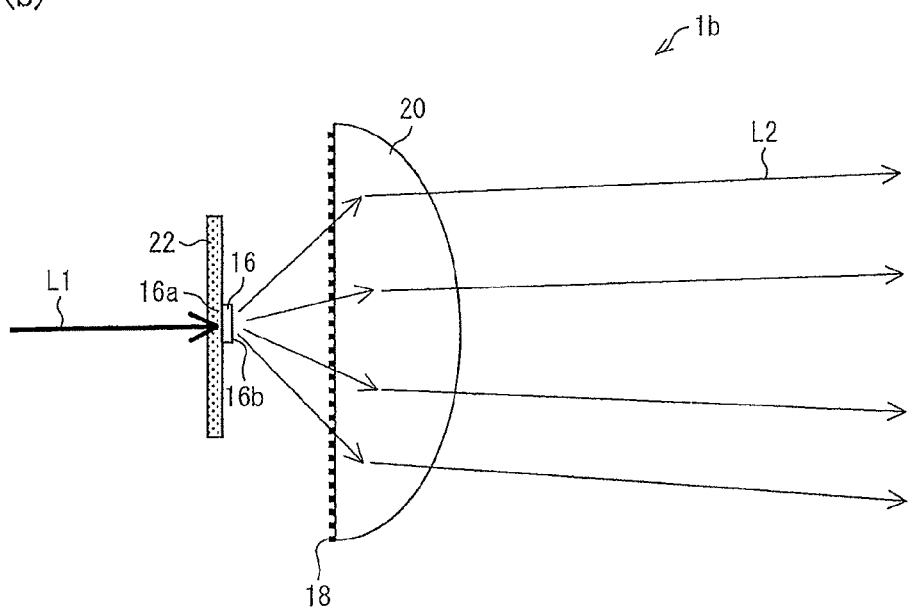

Firstly, the following description discusses the arrangement of a headlight system (vehicular headlight) 100 in accordance with the present embodiment with reference to FIGS. 1 and 2.

FIG. 1 is a cross-section view schematically showing an arrangement of the headlight system 100 in accordance with the present embodiment. As shown in FIG. 1, the headlight system 100 includes a light source device 1, a housing 2 and a headlight cover 3. The headlight system 100 is arranged at each front end of a car on which the headlight system 100 is to be mounted.

(Light Source Device 1)

The light source device 1 includes semiconductor laser elements 11, condensing lenses 12, optical fibers 13, a convex lens 14, a reflective mirror 15, a light-emitting section 16, a reflector 17, a diffusion plate 18 and a metallic base 19.

(Semiconductor Laser Element 11)

A semiconductor laser element (excitation light source) 11 functions as an excitation light source which emits beams of laser light (excitation light) L1. A plurality of semiconductor laser elements 11 may be arranged. In such a case, the beams of the laser light L1 are emitted from each of the semiconductor laser elements 11.

The beams of the laser light L1 emitted from the semiconductor laser elements 11 are in phase spatially and temporally, and the beams of the laser light L1 are of a single wavelength. Using the beams of the laser light L1 as excitation light beams enables effective excitation of a phosphor contained in a light-emitting section 16, which is described below. Therefore, illumination light 2 high in luminance can be obtained.

Each of the semiconductor laser elements 11 has one luminous point in one chip and emits beams of the laser light L. Examples of the laser light include blue laser light beams (440 nm, 450 nm), green laser light beams (530 nm, 533 nm) and red laser light beams (640 nm). The wavelengths of the laser light beams L1 emitted from the semiconductor element 11 may be altered as necessary.

Note that although the light source device 1 includes the semiconductor laser element 11 as an excitation light source, the excitation light source is not limited to the semiconductor laser element 11. The semiconductor laser element 11 may be replaced by a light-emitting diode (LED) to realize the excitation light source.

(Condensing Lens 12)

The condensing lens 12 concentrates the beams of the laser light L1 emitted from the semiconductor laser elements 11 onto input ends, that is, one of the ends of the optical fibers 13. As long as the lens has such functions, the shape and material of the condensing lens 12 are not particularly limited. However, it is preferable that the condensing lens 12 be made from a material having high transmittance of light having a wavelength of approximately 405 nm and having high heat resistance.

(Optical Fiber 13)

The optical fiber 13 is a light guiding member which guides the beams of the laser light L1 emitted from the semiconductor laser elements 11 to the convex lens 14. The optical fiber 13 has a double-layer structure in which a core in the center is covered by cladding which is lower in a refractive index than the core. The beams of the laser light L1 inputted from the input ends pass through the insides of the optical fibers 13, and the beams of the laser light L1 are then outputted from output ends, that is, the other ends of the optical fibers 13. The output ends of the optical fibers 13 are bundled by ferrule or the like.

(Convex Lens 14)

The convex lens 14 adjusts the beam diameter of the laser light L1 outputted from the output ends of the optical fibers 13 so that the whole irradiated surface 16a of the light-emitting section 16 is irradiated with the laser light L1. The convex lens 14 is positioned so that the laser light L1 outputted from the output ends of the optical fibers 13 is directed toward the reflective mirror 15.

(Reflective Mirror 15)

The reflective mirror 15 reflects the laser light L1 whose beam diameter has been adjusted by the convex lens 14 to the light-emitting section 16. The laser light L1 reflected by the reflective mirror 15 is guided to the light-emitting section 16 through a window 17b of a reflector 17.

(Light-Emitting Section 16)

The light-emitting section 16, upon receipt of the laser light L1 emitted from the semiconductor laser elements 11, emits illumination light L2, which is both the laser light L1 and fluorescence obtained by waveform conversion of a portion of the laser light L1. In the present embodiment, the light-emitting section 16 includes a phosphor (a fluorescent substance) which emits fluorescence (wavelength-converted light).

Specifically, the light-emitting section 16 can be obtained by solidifying the mixture of particles of a phosphor with a glass resin, by applying particles of phosphor mixed with a binder, by solidifying particles of a phosphor by sintering, press-forming and the like process, by processing particles of a phosphor into a bulk state in some way, by scattering particles of a phosphor inside a bulk, by depositing binder-coated particles of a phosphor on a substrate which is made of a material high in thermal conductivity, by forming the mixture of particles of phosphor with a resin or the like into a thin film, or by other methods.

The phosphor is exemplified by an oxynitride phosphor (e.g. sialon phosphor) and a group III-V semiconductor nanoparticle phosphor (e.g. indium phosphor: InP). Such phosphors are ideally suited as s phosphor contained in the light-emitting section 16 because of their high heat resistance against the laser light L1 of a high output (and/or light density) emitted from the semiconductor laser elements 11.

However, the phosphor included in the light-emitting section 16 is not limited to the above-listed phosphors. Alternatively, it may be other phosphors such as a nitride phosphor.

Moreover, as regulated by law, the illumination light L2 of the headlight system 100 has to be white in color having a predetermined range of chromaticity. Therefore, in order to realize the illumination light L2 of white color, a combination of the laser light L1 and a phosphor is chosen as appropriate.

For example, when blue laser light is emitted to the light-emitting section 16 that includes a yellow phosphor, a mixture of a blue component of the blue laser light and yellow fluorescence enables the generation of white illumination light L2

Moreover, when blue laser light is emitted to the light-emitting section 16 that includes a red phosphor and a yellow phosphor, a mixture of a blue component of the blue laser light, red fluorescence, and green fluorescence enables the generation of white illumination light L2.

Furthermore, when blue laser light and green laser light are emitted to the light-emitting section 16 that includes a red phosphor, a mixture of a blue component of the blue laser light, a green component of the green laser light, and red fluorescence enables the generation of white illumination light L2.

Alternatively, when blue laser light, green laser light, and red laser light are emitted to the light-emitting section 16 that includes a yellow phosphor, a mixture of a blue component of the blue laser light, a green component of the green laser light, a red component of the red laser light, and yellow fluorescence enables the generation of white illumination light L2.

With this arrangement, deterioration in color rendering properties obtained when white illumination light is generated by blue laser light, green laser light and red laser light can be suitably compensated for by fluorescence of wavelengths in a wide range emitted from a yellow phosphor. Note that such combinations can enhance color reproducibility of illumination light L2 with colors varying from green, yellow, orange to red.

The light-emitting section 16 is mounted on the metallic base 19 and arranged nearly in the focal point of the reflector 17. The light-emitting section 16 receives the laser light L1 with which the irradiated surface 16a is irradiated, and then emits beams of illumination light L2, which are both the laser light L1 and the fluorescence, mainly from the irradiated surface 16a. Therefore, the beams of the illumination light L2 emitted from the light-emitting section 16 are reflected by a curved reflection surface of the reflector 17. This enables the optical paths of the beams of the illumination light L2 to be controlled.

Note that the headlight system 100 is configured to include a light-emitting section (hereinafter referred to as a "reflective light-emitting section") 16 that mainly emits fluorescence from the irradiated surface 16a which is irradiated with the laser light L1. However, instead of this, the headlight system 100 may be configured to include a light-emitting section (hereinafter referred to as a "transmission light-emitting section") 16 that transmits the laser light L1 incident on the irradiated surface 16a and then mainly emits fluorescence from a surface opposite to the irradiated surface 16a.

(Reflector 17)

The reflector (light projection section) 17 projects the illumination light L2 emitted from the light-emitting section 16 in a predetermined direction. In the present embodiment, the reflector 17 reflects illumination light L2 toward the diffusion plate 18. For example, the reflector 17 may be a member having a metal thin film on its surface or may be a metallic member.

FIG. 2 is a conceptual diagram showing a paraboloid of revolution of the reflector 17 in accordance with the present embodiment. In the present embodiment, the reflector 17 of a half parabolic mirror is used. The half parabolic mirror is obtained by cutting a curved surface (curved paraboloid) formed by rotation of the parabola about the axis of symmetry of the parabola as an axis of rotation so that a cross section of the curved surface becomes a plane including the axis of rotation (see FIG. 2).

Therefore, in the present embodiment, the reflector 17 has a semicircular-shaped aperture 17a at a position toward which the illumination light L2 is reflected. Moreover, the semiconductor laser elements 11 are arranged outside the reflector 17, whereas the reflector 17 has a window 17b that causes the laser light L1 to be transmitted or to pass through. The window 17b may be a through hole or may include a transparent member capable of transmitting the laser light L1.

Furthermore, the window 17b may be only one window shared by a plurality of semiconductor laser elements 11 as in the present embodiment. Alternatively, a plurality of windows 17b respectively corresponding to the semiconductor laser elements 11 may be provided.

Note that the reflector 17 may be a parabolic mirror having a closed semicircular aperture 17a or may be a part of the parabolic mirror. Moreover, the reflector 17 is not limited to the parabolic mirror. Alternatively, the reflector 17 may be an elliptically-shaped, free-form curved surface or multifaceted reflector.

(Diffusion Plate 18)

The diffusion plate (light mixing section) 18 mixes the laser light L1 and the fluorescence which are contained in the illumination light L2 while transmitting the illumination light L2 emitted by the light-emitting section 16. The diffusion plate 18 is arranged to abut the edge of the reflector 17 so that the aperture 17a of the reflector 17 is blocked, in order to transmit all the illumination light L2 reflected by the reflector 17.

Some beams of the laser light L1 entering the light-emitting section 16 are directly emitted from the light-emitting section 16 without having their wavelengths changed by the phosphor, and are released anisotropically with an angular distribution biased toward to a specific emission angle, while retaining their directivities.

Therefore, when the laser light L1 and the fluorescence emitted from the light-emitting section 16 are reflected by the reflector 17 and directly outputted as illumination light L2 from the headlight system 100, the color of the illumination light L2 varies depending on a viewing angle, and therefore the illumination light L2 having color uniformity cannot be obtained.

Therefore, the headlight system 100 in accordance with the present embodiment includes the diffusion plate 18 which mixes the illumination light L2 containing the laser light L1 and the fluorescence and emitted from the light-emitting section 16, and emits the illumination light L2 in the form mixed by the diffusion plate 18. As described above, mixing the laser light L1 and the fluorescence by the diffusion plate 18 enables alleviating uneven distribution of the laser light L1 and the fluorescence which are contained in the illumination light L2.

The diffusion plate 18 may be constituted by a material having optical transparency, such as polycarbonate, glass, or acrylic. For example, the diffusion plate 18 can be realized by forming microscopic asperities on at least either an incidence surface 18a which illumination light L2 enters or an exit surface 18b from which illumination light L2 is outputted. As described above, constituting the diffusion plate 18 by forming microscopic asperities on at least either the incidence surface 18a or the exit surface 18b enables reduction of the production costs of the light-mixing member.

In addition, a micro lens array pattern or surface relief holographic pattern may be formed on at least either the incidence surface 18a or the exit surface 18b of the diffusion plate 18. By using the diffusion plate 18 having micro lens array pattern or surface relief holographic pattern which is formed on at least either the incidence surface 18a or the exit surface 18b, it is possible to control the spread of the illumination light L2 emitted. This makes it possible to improve projection properties of the illumination light L2.

It is preferable that such a diffusion plate 18 be arranged such that a maximum full width at half maximum of intensity distribution of outgoing light derived from incoming parallel light is not less than 0.7 degree and not more than 3.0 degree. When the diffusion plate 18 is such that the maximum full width at half maximum of intensity distribution is less than 0.7, it is impossible to obtain the illumination light L2 having color uniformity since the laser light L1 and the fluorescence cannot be sufficiently mixed.

In contrast, when the maximum full width at half maximum of intensity distribution of the diffusion plate 18 exceeds 3.0 degree, scattering of the illumination light L2 in the diffusion plate 18 causes the loss of the amount of light.

Therefore, by adjusting the diffusion plate 18 such that the maximum full width at half maximum of intensity distribution is not less than 0.7 degree and not more than 3.0 degree, it is possible to improve color uniformity of the illumination light L2 while preventing the decrease in the amount of light.

In addition, it is preferable that the diffusion plate 18 transmits the illumination light L2 reflected by the reflector 17 and mixes the laser light L1 and the fluorescence which are contained in the illumination light L2. With this arrangement, since it is only necessary that the diffusion plate 18 be arranged on the light path of the illumination light L2 reflected by the reflector 17, the diffusion plate 18 is easily incorporated into an existing light source device.

(Metallic Base 19)

The metallic base 19 is a plate-shaped support which supports the light-emitting section 16 and other members. The metallic base 19 is made from metal such as aluminum, stainless steel, copper or iron. Therefore, the metallic base 10 is high in thermal conductivity and capable of efficiently radiating heat generated in the light-emitting section 16.

Note that although in the present invention, the metallic base 19 is formed from metal, the metallic base 19 is not limited to this and may be formed from a material including substances having high thermal conductivity (such as high thermal conductive resin, high thermal conductive ceramics, and sapphire) other than metal.

However, it is preferable that a surface of the metallic base 19 which abuts the light-emitting section 16 is subjected to processing for reflection so as to function as a reflecting surface. With such an arrangement in which the surface functions as a reflecting surface, the laser light L1 incident from the irradiated surface (upper surface) 16a and the fluorescence emitted from the phosphor are reflected by the reflecting surface of the metallic base 19. This enables guiding of the illumination light L2 to the reflector 17.

Since the metallic base 19 is covered by the reflector 17, the metallic base possesses a surface facing the curved reflection surface of the reflector 17.

Note that although in the present embodiment, the surface of the metallic base 19 on which the light-emitting section 16 is provided is nearly parallel to the rotation axis of the paraboloid of revolution of the reflector 17 and mostly includes the rotation axis, the present invention is not limited to this arrangement.

(Housing 2)

The housing 2 is a housing member which accommodates the light source device 1. The housing 2 includes two outward-going electrode leads provided to each of the semiconductor laser elements 11, and these two electrode leads are connected to a laser driving circuit (not shown). The laser driving circuit continuously or intermittently applies a predetermined potential difference to a gap between the two electrode leads so that a driving current for driving the semiconductor laser element 11 is injected into the semiconductor laser element 11. Note that it is preferable that the housing 2 be constituted from a light-resistant material capable of shielding light.

(Headlight Cover 3)

The headlight cover (vehicular headlight cover) 3 protects the light source device 1 from the external environment. The headlight cover 3 is arranged to face the aperture 17a of the reflector 17, and transmits the illumination light L2 emitted from the light source device 1. From the viewpoint of headlight causing the illumination light L2 to be transmitted, the headlight cover 3 may be arranged such that only a region through which the illumination light L2 emitted from the light source device 1 passes is formed from a material capable of light transmission.

The headlight cover 3 may be formed from any transparent material. Therefore, an appropriate material can be chosen depending on conditions such as durability and production costs.

[Operation of the Headlight System 100]

Next, the following description explains the operation of the headlight system 100. The beams of the laser light L1 emitted from the semiconductor laser elements 11 pass through the respective condensing lens 12 and are combined at the input ends of the optical fibers 13. The optical fibers 13 are bundled, and the beam diameter of the laser light L1 is adjusted and emitted to the light-emitting section 16 by the convex lens 14 that is provided on the side facing the output ends of the optical fibers 13. With this arrangement, the size of an optical spot can be adjusted so that the whole irradiated surface 16a of the light-emitting section 16 is irradiated with the laser light L1.

The laser light L1 reflected by the reflective mirror 15 passes through the window 17b that is an opening in the reflector 17 and then enters the irradiated surface 16a of the light-emitting section 16. With regard to the laser light L1 entering the light-emitting section 16, a portion thereof is absorbed by the phosphor contained in the light-emitting section 16 and thus turned into wavelength-converted fluorescence.

The light-emitting section 16 emits both the laser light L1 and the fluorescence as the illumination light L2. At this time, the fluorescence is emitted isotropically (in all directions) from the light-emitting section, whereas the laser light L1 is emitted anisotrophically with an angular distribution biased toward a specific emission angle from the light-emitting section 16.

The illumination light L2 emitted from the light-emitting section 16 is reflected by the reflector 17, and the reflected illumination light L2 is then directed toward the aperture 17a to be transmitted through the diffusion plate 18. Since the illumination light L2 is diffused by the diffusion plate 18, the laser light L1 and the fluorescence which are contained in the illumination light L2 are mixed. This alleviates uneven distribution of the laser light L1 and the fluorescence which are contained in the illumination light L2, thus improving color uniformity of the illumination light L2.

[Modification]

Figure 4:
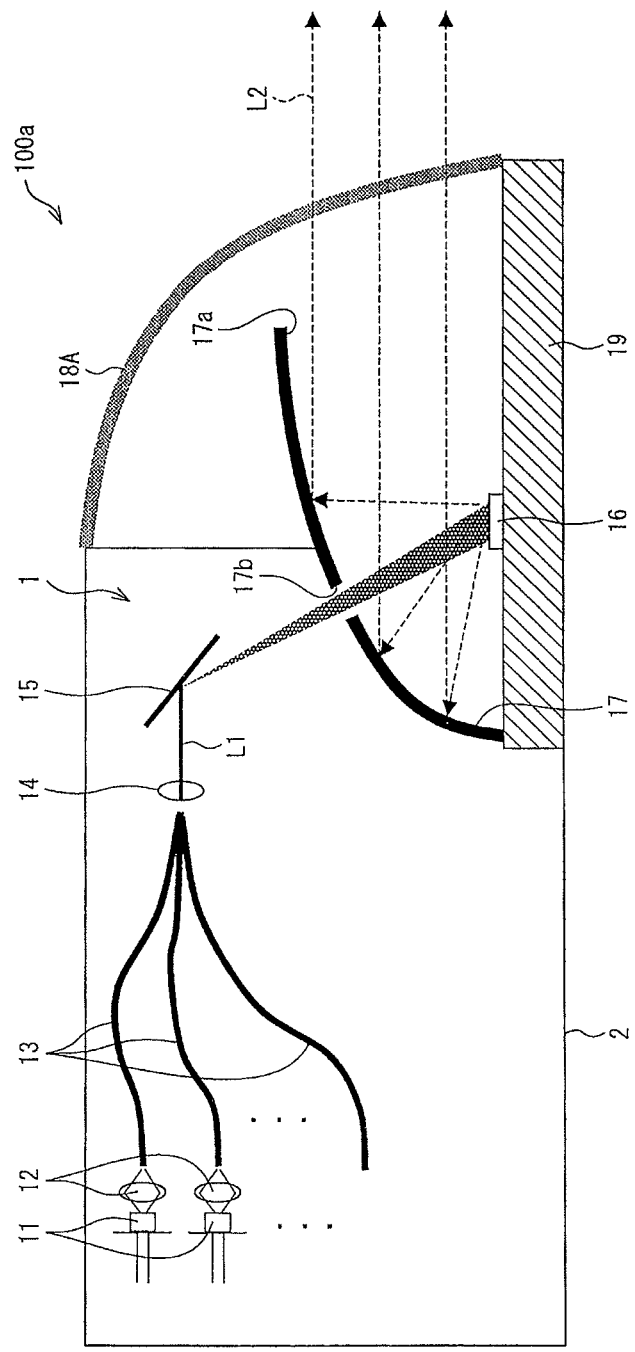
FIG. 4 is a cross-sectional view schematically showing the configuration of a modification of a headlight system illustrated in FIG. 1

Next, the following description discusses modifications of the light source device 1 and the headlight system 100 in accordance with the present embodiment with reference to FIGS. 3(a), 3(b), and 4.

[Modification 1]

While the headlight system 100 is arranged such that the light source device 1 includes the reflector 17 as a light projection member, the light projection member is not limited to the reflector 17. Any member capable of projecting the illumination light L2 emitted from the light-emitting section 16 in the predetermined direction can be used as the light projection member.

In FIGS. 3(a) and 3(b) are cross-sectional views schematically showing the configurations of light source devices 1a and 1b that include a projector lens 20 as the light projection member, wherein (a) shows the light source device 1a including a reflective light-emitting section 16, whereas (b) shows the light source device 1b including a transmission light-emitting section 16.

As in the light source device 1a shown in FIG. 3(a), the diffusion plate 18 and the projector lens (light projection section) 20 may be arranged to face the irradiated surface 16a of the light-emitting section 16, without providing the reflector 17

The projector lens 20 is a convex lens that projects the illumination light L2 passing through the diffusion plate 18 at an angle in a predetermined range.

A heat sink 21 causes heat that is generated in the light-emitting section 16 irradiated with the laser light L1 to dissipate through a contact surface thereof contacting the light-emitting section 16. Although the heat sink 21 is preferably made from a metallic material, such as aluminum and copper, in which heat transfers easily, the material is not specifically limited as long as it has a high thermal conductivity.

In the light source device 1a including the reflective light-emitting section 16, the light-emitting section 16 is placed on the heat sink 21. The surface of the heat sink 21 which abuts the light-emitting section 16 is subjected to processing for reflection so as to function as a reflecting surface. With this arrangement, the light-emitting section 16 allows the laser light L1 incident from irradiated surface 16a of the light-emitting section 16 and the fluorescence to be reflected by the reflecting surface, so that the laser light L1 and the fluorescence are directed as the illumination light L2 toward the diffusion plate 18.

Furthermore, in the light source device 1b including the transmission light-emitting section 16 shown in FIG. 3(b), the light-emitting section 16 is placed on a transparent plate 22 such as glass, through which the irradiated surface 16a of the light-emitting section is irradiated with the laser light L1. With this arrangement, the light-emitting section 16 allows the laser light L1 incident from the irradiated surface 16a of the light-emitting section 16 to transmit, and then emits the laser light L1 and the fluorescence from the emission surface 16b opposite to the irradiated surface 16a toward the diffusion plate 18.

Note that the light source devices 1a and 1b including the projector lens 20 as the light projection member is preferably arranged such that the projector lens 20 is provided so as to abut the diffusion plate 18. Such an arrangement in which the projector lens 20 is placed to abut the diffusion plate 18 enables the diffusion plate 18 and the projection lens 20 to be formed integrally, which enables the light source device 1a to be downsized.

[Modification 2]

Moreover, the headlight system 100 is arranged such that the diffusion plate 18 abuts the edge of the reflector 17 so as to block the aperture 17a of the reflector 17. However, the position of the diffusion plate 18 is not particularly limited. It is only necessary that the diffusion plate 18 be disposed so as to transmit the illumination light L2 emitted from the light-emitting section 16.

For example, the diffusion plate 18 may be arranged at a predetermined distance from the reflector 17 in the direction in which the reflector 17 projects the illumination light L2. As described above, the position of the diffusion plate 18 may be altered as appropriate depending on a usage mode of the light source device 1.

FIG. 4 is a cross-sectional view schematically showing the configuration of the modification of the headlight system 100. A headlight system 100a includes a diffusion plate 18A as a headlight cover (the vehicular headlight cover) for protecting the light source device 1 from the external environment (See FIG. 4).

As described above, the headlight cover is realized by the diffusion plate 18A. This makes it possible to reduce a parts count of the headlight system 100a, thus reducing the production costs of the headlight system 100a.

Summary of First Embodiment

As described above, the headlight system 100 in accordance with the present embodiment includes: a semiconductor laser element 11 that emits laser light L1; a light-emitting section 16, upon receipt of the laser light L1 emitted by the semiconductor laser element 11, emits illumination light L2 which is both the laser light L1 and fluorescence obtained by wavelength conversion of a portion of the laser light L1; and a diffusion plate 18 that mixes the laser light L1 and the fluorescence which are contained in the illumination light L2 thus emitted by the light-emitting section 16.

According to the headlight system 100, the laser light L1 and the fluorescence both mixed by the diffusion plate 18 are emitted as the illumination light L2. This enables alleviating uneven distribution of the laser light and the fluorescence which are contained in the illumination light L2.

Therefore, in accordance with the present embodiment, it is possible to realize the headlight system 100 with improved color uniformity of the illumination light L2.

Second Embodiment

Figure 5:
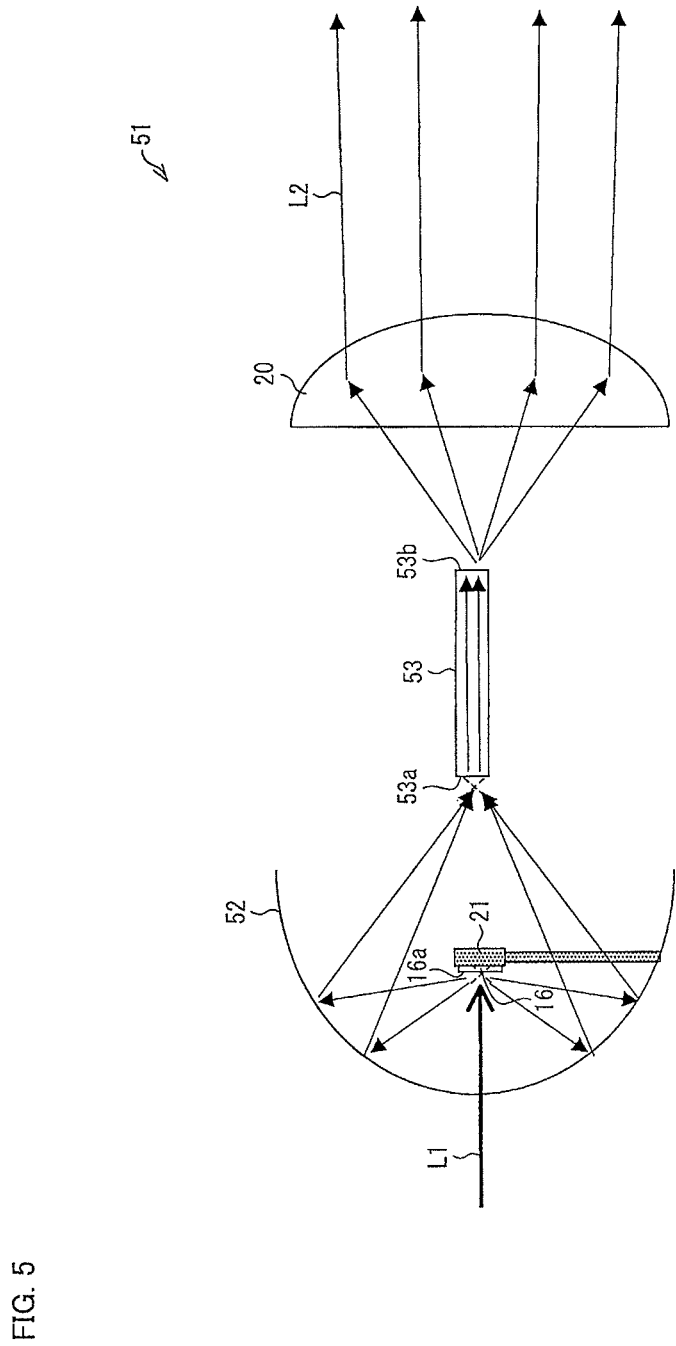
FIG. 5 is a cross-sectional view schematically showing the configuration of a light source device in accordance with Second Embodiment.
Figure 6:
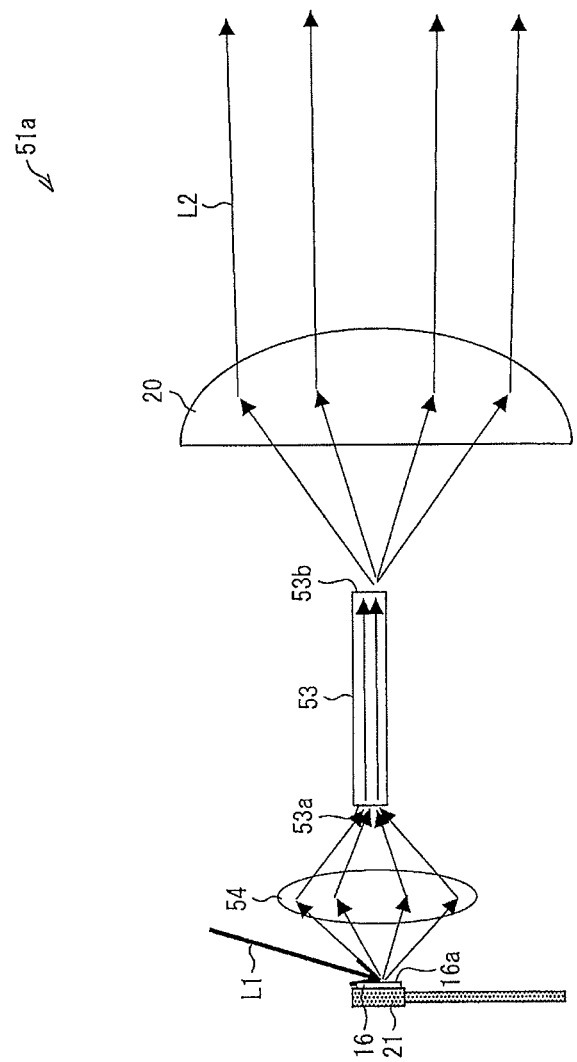
FIG. 6 is a cross-sectional view schematically showing the configuration of a light source device having a condensing lens as a condensing member.
Figure 7:
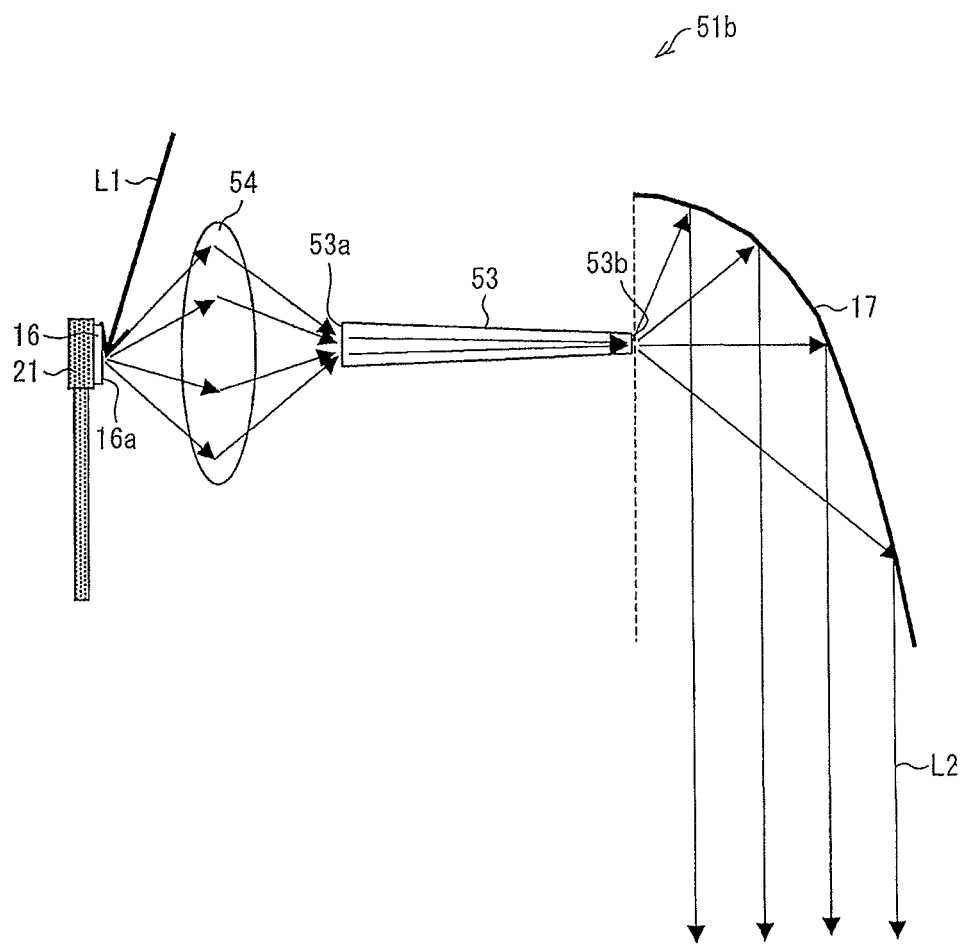
FIG. 7 is a cross-sectional view schematically showing the configuration of a light source device having a reflector as a light projection member.

The following description discusses a light source device in accordance with the Second Embodiment of the present invention with reference to FIGS. 5 to 7. Although the First Embodiment discusses the light source device 1 which includes the diffusion plate 18 as the light mixing section, the present embodiment discusses a light source device which includes a rod lens as the light mixing section.

Note that the same reference numerals are provided to members having the same functions as those in the drawings discussed in the above embodiment, for convenience of explanation.

[Arrangement of Light Source Device 51]

Firstly, the following description discusses the configuration of the light source device in accordance with the present embodiment with reference to FIG. 5. FIG. 5 is a cross-sectional view showing the configuration of essential part of a light source device 51 in accordance with the present embodiment. The light source device 51 includes a light-emitting section 16, a heat sink 21, an elliptic mirror 52, a rod lens (light mixing section) 53 and a projector lens 20 (see FIG. 5). Note that some of the members included in the light source device 51, such as a semiconductor laser element 11, are omitted in FIG. 5 for convenience of explanation.

(Elliptic Mirror 52)

The elliptic mirror (condensing section) 52 is a condensing member which concentrates illumination light L2 emitted from the light-emitting section 16 onto the rod lens 53. The elliptic mirror 52 has a first focus and a second focus on a rotation axis. The light-emitting section 16 supported by the heat sink 21 is located on the first focus of the elliptic mirror 52, whereas an incidence end 53a of the rod lens 53 is located on the second focus. This arrangement allows the elliptic mirror 52 to concentrate the illumination light L2 emitted from the light-emitting section 16 onto the incidence end 53a of the rod lens 53.

(Rod Lens 53)

The rod lens 53 is a light mixing member that mixes the laser light L1 and the fluorescence which are contained in the illumination light L2 concentrated by the elliptic mirror 52. The rod lens 53 causes the light concentrated by the elliptic mirror 52 to enter the incidence end 53a, guides the light to an emission end 53b while reflecting the light inside the rod lens 53, and then emits the light from the emission end 53b toward the projector lens 20. The laser light L1 and the fluorescence are sufficiently mixed in the process in which the illumination light L2 is reflected inside the rod lens 53. This enables the laser light L1 and the fluorescence to be mixed efficiently.

As described above, mixing the laser light L1 and fluorescence by the rod lens 53 alleviates the unevenness of the distribution of the laser light L1 and the fluorescence which are contained in the illumination light L2, and further improves the color uniformity of the illumination light L2.

Note that the rod lens 53 can be realized by, for example, glass of 2 mm in diameter and 10 mm in length from the incidence end 53a to the emission end 53b. Moreover, the shape of the rod lens 53 may be either cylindrical or prismatic and be chosen in accordance with a desired shape of the illumination light spot.

[Modification]

Next, the following description discusses modifications of the light source device 51 in accordance with the present embodiment with reference to FIGS. 6 and 7.

(Modification 1)

Although the light source device 51 includes the elliptic mirror 52 as a condensing member, a condensing member is not limited to the elliptic mirror 52. Any member capable of concentrating the illumination light L2 emitted from the light-emitting section 16 onto the rod lens 53 can be used as the condensing member.

FIG. 6 is a cross-sectional view schematically showing the configuration of a light source device 51a which includes a condensing lens 54 as a condensing member. As the light source device 51a shown in FIG. 6, the condensing lens (condensing section) 54 may be placed between the light-emitting section 16 and the rod lens 53 without providing the elliptic mirror 52.

As described above, provision of the condensing lens 54 as the condensing member enables the diffusion plate 18 and the light source device 51a to be downsized.

(Modification 2)

Furthermore, although the light source device 51 includes the projector lens 20 as a light projection member, the light projection member is not limited to the projector lens 20. Even in the arrangement including the rod lens 53, the reflector 17 explained in the First Embodiment can be used as a light projection member.

FIG. 7 is a cross sectional view schematically showing the configuration of the light source device 51b including the reflector 17. The light source device 51b includes the reflector 17 instead of the projector lens 20, and the emitting end 53b of the rod lens 53 is located nearly at the focal point of the reflector 17 (See FIG. 7). With this arrangement, the light source device 51b enables control of the light path of the illumination light L2 emitted from the emitting end 53b of the rod lens 53 since the illumination light L2 is reflected by the curved reflection surface of the reflector 17.

Note that in a case where the reflector 17 is used as a light projection member as in the light source device 51b, it is preferable that the rod lens 53 be tapered down in a direction from the incidence end 53a to the emission end 53b. This enables the emitting end 53b to have a small diameter. In this case, when the emission end 53b is placed at the focal point of the reflector 17, the emission end 53b functions as a point light source for the reflector 17. This enables more precise control of the light path of the illumination light L2 by means of the reflector 17.

Summary of Second Embodiment

As described above, the light source device 51 in accordance with the present embodiment includes: a semiconductor laser element 11 that emits laser light L1; a light-emitting section 16, upon receipt of the laser light L1 emitted by the semiconductor laser element 11, emits illumination light L2 which is both the laser light L1 and fluorescence obtained by wavelength conversion of a portion of the laser light L1; an elliptic mirror 52 that concentrates the illumination light L2 emitted by the light-emitting section 16; and a rod lens 53 that causes the illumination light L2 thus concentrated by the elliptic mirror 52 to be reflected inside thereof so that the laser light L1 and the fluorescence which are contained in the illumination light L2 are mixed.

According to the light source device 51, it is possible to enhance efficiency of mixing the laser light L1 and the fluorescence since the laser light L1 and the fluorescence are mixed in the process of being reflected inside the rod lens 53.

Therefore, according to the present embodiment, it is possible to realize the light source device 51 with further improvement in color uniformity of the illumination light L2.

Example 1

Figure 8:
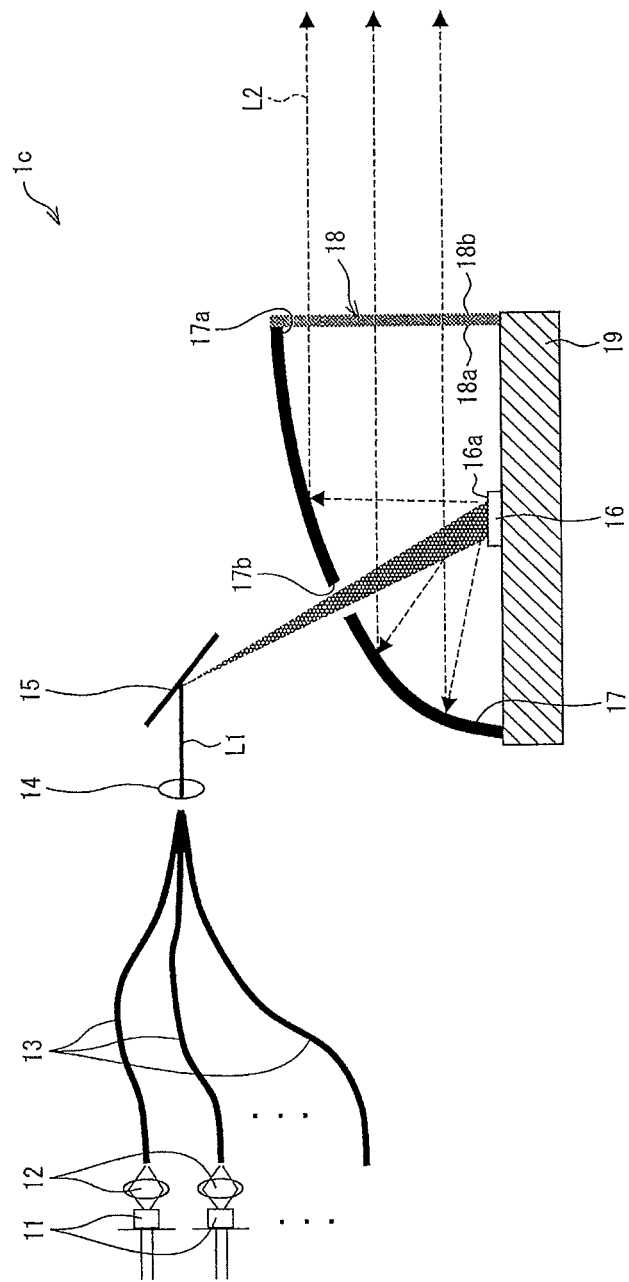
FIG. 8 is a cross-sectional view showing schematically showing the configuration of the first example of the light source device in accordance with the present invention.

The following description discusses a first example of a light source device in accordance with the present invention with reference to FIG. 8. Note that the same reference numerals are provided to members having the same functions as those in the drawings discussed in the above embodiments, for convenience of explanation.

FIG. 8 is a cross-sectional view schematically showing the configuration of a light source device 1c in accordance with the present example. The light source device 1c includes semiconductor laser elements 11, condensing lenses 12, optical fibers 13, a convex lens 14, a reflective mirror 15, a light-emitting section 16, a reflector 17, a diffusion plate 18 and a metallic base 19 (see FIG. 8).

The light source device 1c in accordance with the present example includes four semiconductor laser elements 11 each of which emits blue laser light beams (450 nm) and has an output power of 1 W.

The light-emitting section 16 includes a yellow phosphor which, upon receipt of blue laser light, emits yellow fluorescence. The component of the yellow phosphor is expressed by $(Y_{1-x-y}Gd_xCe_y)_3Al_5O_{12}$ ($0.1 \leq x \leq 0.55$, $0.01 \leq y \leq 0.4$). The light-emitting section 16 is disc-shaped with a diameter of 2 mm and a thickness of 0.1 mm, and particles of the yellow phosphor mixed with resin are applied to the metallic base 19.

The reflector 17 is a half parabolic mirror having a semicircular aperture 17a of 30-mm radius, and the depth of the reflector 17 is 30 mm. The reflector 17 has a window 17b that causes the laser light L1 to be transmitted or to pass through. The light-emitting section 16 is placed at the focal point of the reflector 17 which is located on the aluminum-deposited metallic base 19 made from copper.

The diffusion plate 18 is made from polycarbonate and has a thickness of 1 mm. Moreover, microscopic asperities are formed on its incidence surface 18a so that the incidence surface 18 becomes a frosted glass-like surface. The diffusion plate 18 is arranged such that a maximum full width at half maximum of intensity distribution of outgoing light derived from incoming parallel light is 0.2 degree.

The diffusion plate 18 is arranged to abut the end of the reflector 17 so as to block the aperture 17 a of the reflector 17.

In the light source device 1c having the above arrangement, beams of the laser light L1 emitted by the semiconductor laser elements 11 pass through the respective condensing lenses 12 and then combined at the output ends of the optical fibers 13. The laser light L1 is subjected to adjustment in its beam diameter by the convex lens 14, which is provided on the side facing the output ends of the optical fibers 13, and the laser light L1 is then emitted toward the reflective mirror 15.

The laser light L1 reflected by the reflective mirror 15 passes through the window 17b that is an opening in the reflector 17 and then strikes the light-emitting section 16. In the light source device 1c, the irradiated surface 16a of the light-emitting section 16 is irradiated with the laser light L1 at an angle of 45 degrees. With regard to the laser light L1 entering the light-emitting section 16, a portion thereof is absorbed by the yellow phosphor and thus turned into wavelength-converted yellow fluorescence, whereas the other portion of the laser light L1 is directly emitted anisotropically to the outside.

The outgoing blue laser light and the outgoing yellow fluorescence emitted from the light-emitting section 16 are reflected toward the aperture 17a by the reflector 17, and then pass through the diffusion plate 18 to be mixed together. Thereafter, the mixture of the blue laser light and the yellow fluorescence is outputted as illumination light L2 from the light source device 1.

In the present example, white illumination light L2 having less color nonuniformity, in which a blue component of the blue laser and yellow fluorescence were mixed, was outputted from the exit surface 18b of the diffusion plate 18.

As described above, according to the light source device 1c in accordance with the present example, white illumination light L2 with improved color uniformity was obtained by using blue laser light and yellow fluorescence.

Example 2

Figure 9:
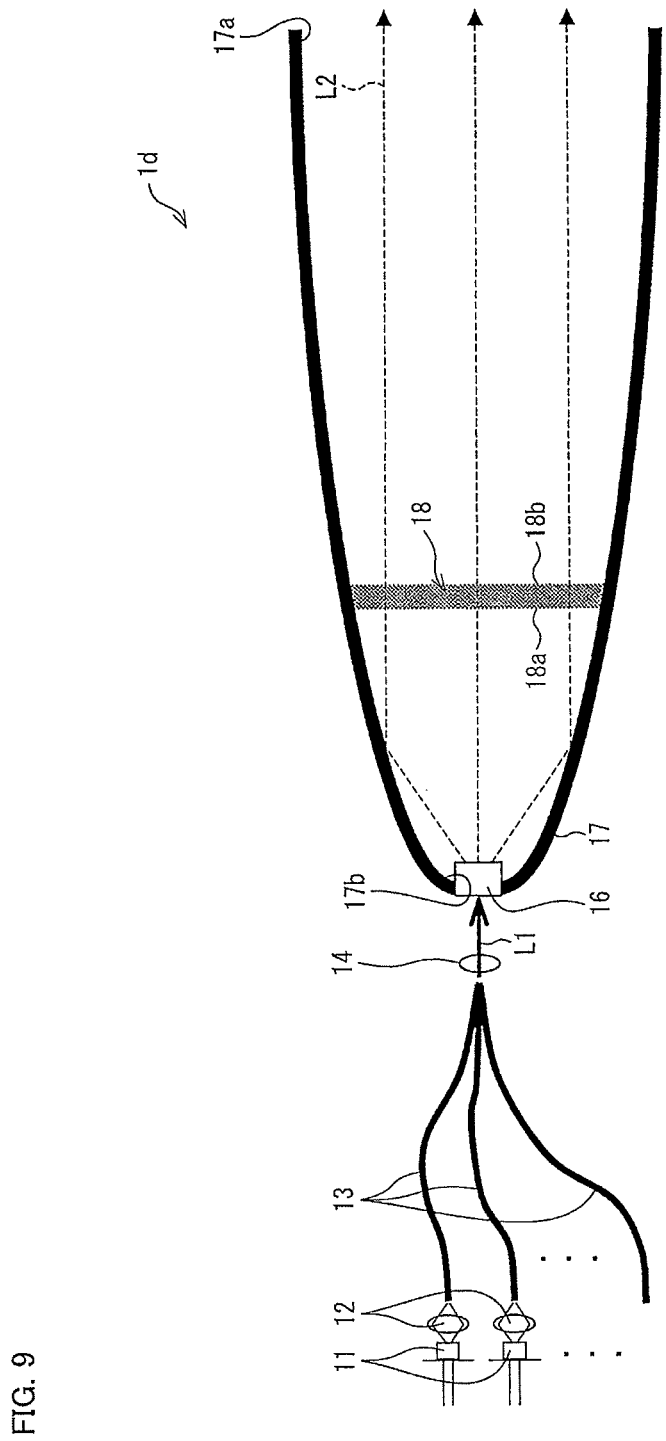
FIG. 9 is a cross-sectional view schematically showing the configuration of the second example of the light source device in accordance with the present invention.

The following description discusses the second example of the light source device in accordance with the present invention with reference to FIG. 9. Note that the same reference numerals are provided to members having the same functions to those in the drawings discussed in the above embodiments, for convenience of explanation.

FIG. 9 is a cross-sectional view schematically showing the configuration of a light source device 1d in accordance with the present example. The light source device 1d includes semiconductor laser elements 11, condensing lenses 12, optical fibers 13, a convex lens 14, a light-emitting section 16, a reflector 17 and a diffusion plate 18 (see FIG. 9).

The light source device 1d in accordance with the present example includes three semiconductor laser elements 11 each of which emits blue laser light beams (450 nm) and has an output power of 1 W.

The light-emitting section 16 includes a yellow phosphor which, upon receipt of blue laser light, emits yellow fluorescence and a red phosphor which, upon receipt of blue laser light, emits red fluorescence. The component of the yellow phosphor is expressed by $(Y_{1-x-y}Gd_xCe_y)_3Al_5O_{12}$ ($0.1 \leq x \leq 0.55$, $0.01 \leq y \leq 0.4$), whereas the components of the red phosphor are $CaAlSiN_3$; Eu. The light-emitting section 16 has a diameter of 1.0 mm and a thickness of 0.1 mm, and particles of the yellow phosphor and the red phosphor are applied in film form onto the light-emitting section 16 by electrophoresis.

The reflector 17 is a parabolic mirror having a round aperture 17a of 50-mm radius, and the depth of the reflector 17 is 120 mm. The reflector 17 has a window 17b on its bottom which is located on the rotation axis of the reflector 17. The light-emitting section 16 is placed at the bottom of the reflector 17 so as to block the window 17b, by being stuck to the bottom of the reflector 17 with a high-temperature conductive adhesive.

The diffusion plate 18 is made from glass and has a thickness of 1 mm. Microscopic asperities are formed on the incidence surface 18a of the diffusion plate 18 so that the incidence surface 18a becomes a frosted glass-like surface. The diffusion plate 18 is arranged to abut the inner surface of the reflector 17 inside the reflector 17.

In the light source device 1d, the convex lens 14, the light-emitting section 16 and the diffusion plate 18 are arranged along the rotation axis of the reflector 17.

In the light source device 1d having the above arrangement, beams of the laser light L1 emitted by the semiconductor laser elements 11 pass through the respective condensing lenses 12 and then combined at the output ends of the optical fibers 13. The laser light L1 is subjected to adjustment in its beam diameter by the convex lens 14, which is provided on the side facing the output ends of the optical fibers 13, and the laser light L1 passes through the window 17b that is an opening in the reflector 17 and then strikes the light-emitting section 16. In the light source device 1d, the laser light L1 is emitted along the rotation axis of the reflector 17 toward the light-emitting section 16.

With regard to the laser light L1 entering the light-emitting section 16, a portion thereof is absorbed by the yellow phosphor and the red phosphor thus turned into wavelength-converted yellow fluorescence and red fluorescence, whereas the other portion of the laser light L1 is directly emitted to the outside.

The outgoing laser light L1, the outgoing yellow fluorescence and the outgoing red fluorescence emitted from the light-emitting section 16 are reflected toward the aperture 17a by the reflector 17. The reflected laser light L1, yellow fluorescence, and red fluorescence are then transmitted through the diffusion plate 18 to be outputted as illumination light L2 from the light source device 1d.

In the present example, white illumination light L2 having less color nonuniformity, in which a blue component of the blue laser light, yellow fluorescence and red fluorescence were mixed, was outputted from the exit surface 18b of the diffusion plate 18.

As described above, according to the light source device 1d in accordance with the present example, white illumination light L2 with improved color uniformity was obtained by using blue laser light, yellow fluorescence and red fluorescence.

Example 3

Figure 10:
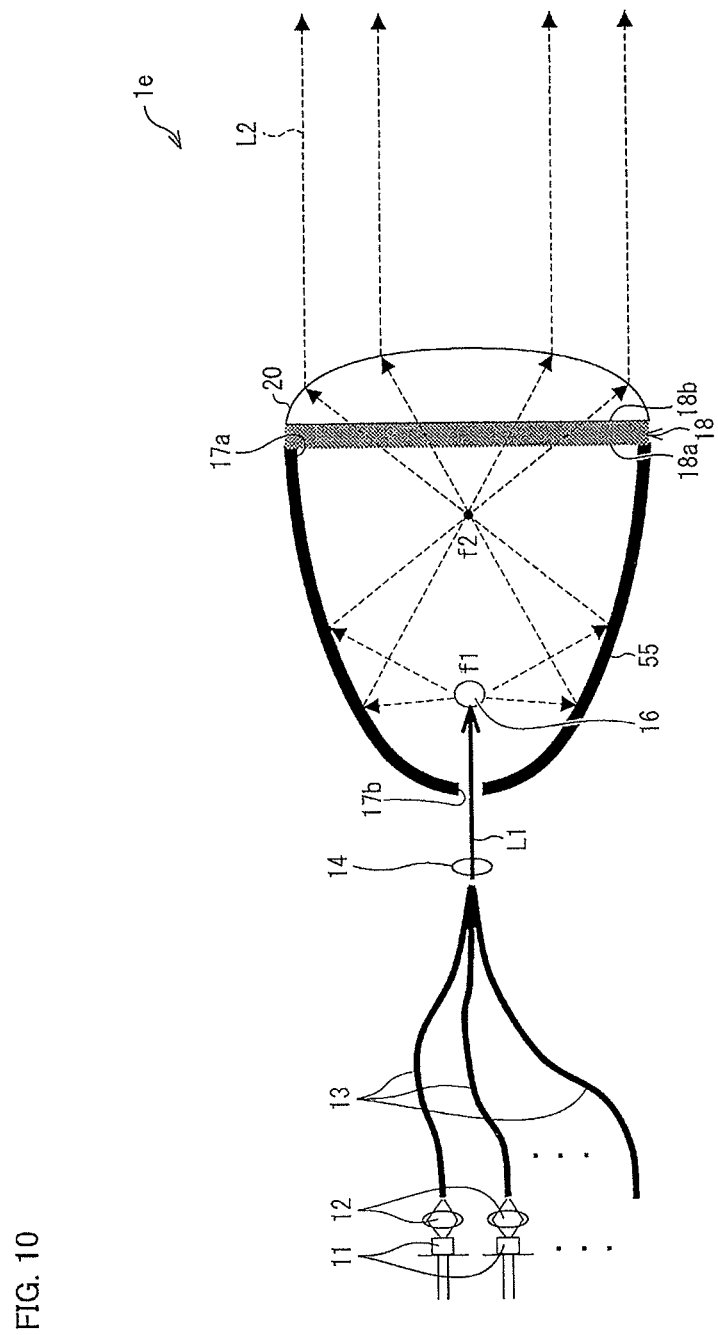
FIG. 10 is a cross-sectional view schematically showing the configuration of the third example of the light source device in accordance with the present invention.

The following description discusses the third example of the light source device in accordance with the present invention with reference to FIG. 10. Note that the same reference numerals are provided to members having the same functions to those in the drawings discussed in the above embodiments, for convenience of explanation.

FIG. 10 is a cross-sectional view schematically showing the configuration of a light source device 1e in accordance with the present example. The light source device 1e includes semiconductor laser elements 11, condensing lenses 12, optical fibers 13, a convex lens 14, a light-emitting section 16, a reflecting section 55, a diffusion plate 18 and a projector lens 20 (see FIG. 10).

The light source device 1e in accordance with the present example includes two semiconductor laser elements 11 each of which emits blue laser light beams (450 nm) and has an output power of 1 W, and three semiconductor laser elements 11 each of which emits green laser light beams (530 nm) and has an output power of 0.5 W The light-emitting section 16 includes a red phosphor which, upon receipt of blue laser light, emits red fluorescence. The components of the red phosphor are $CaAlSiN_3$; Eu. The light-emitting section 16 has a diameter of 1 mm and a thickness of 1.0 mm, and the light-emitting section 16 is formed from a resin in which phosphor is scattered.

The reflector 17 is a parabolic mirror having a round aperture 17a of 50-mm radius, and the depth of the reflector 17 is 100 mm. The reflector 17 has a window 17b on its bottom which is located on the rotation axis of the reflector 17. The light-emitting section 16 is supported by a metallic supporting rod (not shown) at a first focal point f1 of the reflector 17 on the rotation axis of the reflector 17.

The diffusion plate 18 is made from acryl and has a thickness of 0.2 mm. Microscopic asperities are formed on the incidence surface 18a of the diffusion plate 18 so that the incidence surface 18a becomes a frosted glass-like surface. The diffusion plate 18 is arranged to abut the end of the reflector 17 so as to block the aperture 17a of the reflector 17.

The projector lens 20 projects illumination light L2 transmitted through the diffusion plate 18 at an angle in a predetermined range, and the projector lens 20 is arranged to abut the exit surface 18b of the diffusion plate 18.

In the light source device 1e having the above arrangement, beams of the laser light L1 emitted by the semiconductor laser elements 11 pass through the respective condensing lenses 12 and then combined at the output ends of the optical fibers 13. The laser light L1 is subjected to adjustment in its beam diameter by the convex lens 14, which is provided on the side facing the output ends of the optical fibers 13, and the laser light L1 passes through the window 17b that is an opening on the bottom of the reflector 17 and then strikes the light-emitting section 16. In the light source device 1e, the laser light L1 is emitted along the rotation axis of the reflector 17 toward the light-emitting section 16. With regard to the laser light L1 entering the light-emitting section 16, a portion thereof is absorbed by the red phosphor and thus turned into wavelength-converted red fluorescence, whereas the other portion of the laser light L1 is directly emitted to the outside.

The outgoing laser light L1 and red fluorescence emitted from the light-emitting section 16, which is placed at the first focal point f1, are reflected toward a second focal point f2 by the reflector 17. After passing through the second focal point f2, the reflected laser light L1 and red fluorescence are transmitted through the diffusion plate 18 to be mixed together. Thereafter, the mixture of the laser light L1 and the red fluorescence is projected at an angle in a predetermined range by the projector lens 20.

In the present example, white illumination light L2 having less color nonuniformity, in which a blue component of the blue laser light, a green component of the green laser light and red fluorescence were mixed, was outputted from the projector lens 20.

As described above, according to the light source device 1e in accordance with the present example, white illumination light L2 with improved color uniformity was obtained by using blue laser light, green laser light and red fluorescence.

The present invention is not limited to the aforementioned embodiments and is susceptible of various changes within the scope of the accompanying claims. Also, an embodiment obtained by suitable combinations of technical means disclosed in the different embodiments are also included within the technical scope of the present invention.

Summary of Embodiments

As mentioned earlier, a light source device in accordance with the present invention includes: an excitation light source that emits excitation light; a light-emitting section that, upon receipt of excitation light emitted from the excitation light source, emits illumination light which is both the excitation light and wavelength-converted light obtained by wavelength conversion of a portion of the excitation light; and a light-mixing section that mixes the excitation light and the wavelength-converted light which are contained in the illumination light emitted by the light-emitting section.

According to the above arrangement, when the light-emitting section receives excitation light emitted from the excitation light source, the light-emitting section emits the excitation light and wavelength-converted light obtained by wavelength conversion of a portion of the excitation light, and the light source device emits both the excitation light and the wavelength-converted light as illumination light.

In order to irradiate a predetermined region of the light-emitting section, light having high directivity is generally used as excitation light. Therefore, some portion of the excitation light entering the light-emitting section is directly emitted from the light-emitting section without being subjected to wavelength conversion, and is released anisotropically with an angular distribution biased toward to a specific emission angle while retaining its original directivity.

Therefore, when the excitation light and the wavelength-converted light emitted from the light-emitting section are directly used as illumination light, the color of the illumination light varies depending on a viewing angle, causing color nonuniformity of the illumination light.

Accordingly, the light source device in accordance with the present invention includes the light-mixing section which mixes the excitation light and the wavelength-converted light emitted from the light-emitting section, and emits the excitation light and the wavelength-converted light mixed by the light-mixing section as illumination light. As described above, mixing the excitation light and the wavelength-converted light by means of the light mixing section enables the distribution of excitation light and wavelength-converted light contained in the illumination light to be more even than directly outputting the excitation light as the illumination light.

Thus, according to the above arrangement, it is possible to realize a light source device with improved color uniformity of illumination light.

Moreover, the light source device in accordance with the present invention is preferably such that the light-mixing section is a diffusion plate that transmits and diffuses the illumination light.

As in the above arrangement, the light mixing section can be realized by the diffusion plate which diffuses illumination light while transmitting the same. For example, a plate-shaped member capable of projecting light and having microscopic asperities formed at least on its incidence surface or exit surface may be used as the diffusion plate.

Therefore, according to the above arrangement, the light-mixing section which mixes the excitation light and the wavelength-converted light can be produced easily and at low cost. This reduces the production cost of the light mixing section.

Furthermore, the light source device in accordance with the present invention is preferably such that a maximum full width at half maximum of intensity distribution of outgoing light derived from incoming parallel light is not less than 0.7 degree and not more than 3.0 degree.

When the diffusion plate is such that the maximum full width at half maximum of intensity distribution is less than 0.7, it is impossible to obtain the illumination light having color uniformity since the excitation light and wavelength-converted light cannot be sufficiently mixed.

In contrast, when the maximum full width at half maximum of intensity distribution of the diffusion plate exceeds 3.0 degree, scattering of the illumination light in the diffusion plate causes the loss of the amount of light.

Therefore, as in the above arrangement, by adjusting the diffusion plate such that the maximum full width at half maximum of intensity distribution is not less than 0.7 degree and not more than 3.0 degree, it is possible to improve color uniformity of the illumination light while preventing the decrease in the amount of light.

In addition, the light source device in accordance with the present invention is preferably such that the diffusion plate has a micro lens array pattern or surface relief holographic pattern formed thereon.

According to the above arrangement, the diffusion plate has a micro lens array pattern or a surface relief holographic pattern formed thereon. With the diffusion plate, it is possible to control the spread of the transmitted illumination light.

Therefore, according to the above arrangement, it is possible to control the spread of the illumination light and to thus improve light-projecting capability of the light source device.

Moreover, it is preferable that the light source device in accordance with the present invention further include a light projection section that projects the illumination light emitted by the light-emitting section in a predetermined direction.

According to the above arrangement, since the light source device in accordance with the present invention further includes the light projection section which projects the illumination light emitted from the light-emitting section in a predetermined direction, it is possible to emit the illumination light toward a desired region.

Moreover, the light source device in accordance with the present invention is preferably such that the diffusion plate mixes the excitation light and the wavelength-converted light which are contained in the illumination light projected by the light projection section.

According to the above arrangement, the diffusion plate mixes the excitation light and the wavelength-converted light which are included in the illumination light projected by the light projection section. More specifically, according to the above arrangement, the light projection section is arranged upstream with respect to a direction in which the projected illumination light travels, whereas the diffusion plate is arranged downstream.

Therefore, in accordance with the above arrangement, it is only necessary that the diffusion plate be arranged on the light path of the illumination light projected by the light projection section. This facilitates the diffusion plate to be incorporated into an existing light source.

In addition, the light source device in accordance with the present invention is preferably such that the light projection section is a projector lens, and the projector lens is provided so as to abut the diffusion plate.

According to the above arrangement, the light source device includes, as the light projection section, the projector lens which is provided so as to abut the diffusion plate. This makes it possible to integrally form the diffusion plate and light projection section.

Therefore, in accordance with the above arrangement, it is possible to downsize the light source device.

Furthermore, it is preferable that the light source device in accordance with the present invention further include a condensing section that concentrates the illumination light emitted from the light-emitting section onto the light mixing section; and a light projection section that projects the illumination light obtained by the mixture by the light mixing section in the predetermined direction of light projection. It is also preferable that the light mixing section cause light thus concentrated by the condensing section to be reflected inside thereof and then emit the light thus reflected toward the light projection section.

In accordance with the arrangement, the light source device in the present invention further includes: the condensing section which concentrates the illumination light emitted from the light-emitting section onto the light-mixing section; and the light projection section which projects the illumination light mixed by the light mixing section in a predetermined direction. The light mixing section causes the illumination light concentrated by the light-emitting section to reflect inside thereof and then emits the illumination light toward the light projection section.

Therefore, the excitation light and the wavelength-converted light are mixed in the process in which the excitation light and the wavelength-converted light are reflected inside the light mixing section. This makes it possible to enhance efficiency in mixing the excitation light and the wavelength-converted light.

Thus, according to the above arrangement, it is possible to further improve color uniformity of the illumination light irradiated from the light source device.

Moreover, the light source device in accordance with the present invention is preferably such that the excitation light source is a semiconductor laser element or a light-emitting diode, and the excitation light is visible light emitted from the semiconductor laser element or the light-emitting diode.

According to the above arrangement, the excitation light source is a semiconductor laser element or a light emitting diode, and visible light emitted from the semiconductor laser element or the light-emitting diode can be used as a portion of illumination light.

In addition, the light source device in accordance with the present invention is preferably such that the excitation light is laser light.

In accordance with the above arrangement, since laser light is used as the excitation light, it is possible to efficiently excite the light-emitting section.

Therefore, according to the above arrangement, it is possible to obtain illumination light of high intensity.

Moreover, the light source device in accordance with the present invention is preferably such that the light-emitting section comprises a phosphor that receives the excitation light and then emits fluorescence, and the wavelength-converted light is fluorescence that is emitted from the phosphor excited by the excitation light.

According to the above arrangement, the light-emitting section includes a phosphor which emits fluorescence upon receipt of the excitation light, and uses the fluorescence emitted from the phosphor as a portion of the illumination light.

Therefore, according the above arrangement, it is possible to obtain the illumination light by mixing the excitation light emitted from the excitation light source and the fluorescence emitted from the phosphor. This makes it possible to obtain illumination light of various colors by changing a combination of the excitation light source and the phosphor.

Moreover, the light source device in accordance with the present invention is preferably such that the light-emitting section emits the wavelength-converted light from an irradiated surface which receives the excitation light.

As in the above arrangement, in the light-emitting section (reflective light-emitting section) that emits wavelength-converted light from its irradiated surface, which is a surface that receives the excitation light, the emission angle of the excitation light outputted from the light-emitting section is likely to vary.

Therefore, by applying the present invention to a light source device including such a reflective light-emitting section, it is possible to effectively improve color uniformity of the illumination light.

In addition, a lighting device in accordance with the present invention includes the above-described light source device.

Therefore, according to the above arrangement, it is possible to realize a lighting device with improved color uniformity of illumination light.

Furthermore, a vehicular headlight in accordance with the present invention includes the above-described light source device.

Therefore, according to the above arrangement, it is possible to realize a vehicular headlight with improved color uniformity of illumination light.

In addition, a vehicular headlight in accordance with the present invention is a vehicular headlight including the above-described light source device, and it is preferable that the diffusion plate be constituted as a vehicular headlight cover for protecting the light source device from an external environment.

In accordance with the above arrangement, the diffusion plate also acts as a vehicular headlight cover for protecting the light source device from the external environment. This makes it possible to reduce a parts count of the vehicular headlight.

Therefore, in accordance with the above arrangement, it is possible to realize a vehicular headlight with improved color uniformity of illumination light at low cost.

Moreover, a vehicle according to the present invention includes the above-described vehicular headlight.

According to the above arrangement, it is possible to realize a vehicle capable of emitting illumination light with improved color uniformity.

INDUSTRIAL APPLICABILITY

The present invention is applicable to a light source device and a lighting device. In particular, the present invention is suitably applicable to a headlight for a vehicle and the like.

REFERENCE SIGNS LIST

1 Light source device
1a Light source device
1b Light source device
1c Light source device
1d Light source device
3 Headlight cover (vehicular headlight cover)
11 Semiconductor laser element (excitation light source)
16 Light-emitting section
16a Irradiated surface 17 Reflector (light-projection section)
18 Diffusion plate (light-mixing section)
18A Diffusion plate (light-mixing section)
20 Projector lens (light-projection section)
51 Light source device
51a Light source device
51b Light source device
52 Elliptic mirror (condensing section)
53 Rod lens (light-mixing section)
54 Condensing lens (condensing section)

The invention claimed is:

1. A light source device comprising:
an excitation light source that emits excitation light;
a light-emitting section that, upon receipt of excitation light emitted from the excitation light source, emits illumination light which is both the excitation light and wavelength-converted light obtained by wavelength conversion of a portion of the excitation light;
a light-mixing section that mixes the excitation light and the wavelength-converted light which are contained in the illumination light emitted by the light-emitting section; and
a light projection section that projects the illumination light emitted by the light-emitting section in a predetermined direction,
wherein the light-mixing section comprises a diffusion plate that transmits and diffuses the illumination light projected thereto by the light projection section so that all light emitted outward from the light source device is light which has been transmitted and diffused by the diffusion plate, the light-mixing section allowing the illumination light to pass through the light-mixing section for transmission of the illumination light,
the excitation light is laser light and the excitation light source is a laser element,
the light-emitting section has a first surface and a second surface opposite from the first surface and emits the wavelength-converted light from the first surface and receives the excitation light at the first surface,
the second surface of the light-emitting section is covered by a metallic material plate,
the light projection section is a projector lens having a light projecting surface projecting light and light incident surface receiving light, and
the light-mixing section as a whole is in contact with the light incident surface of the projection lens.

2. The light source device according to claim 1, wherein the diffusion plate is such that a maximum full width at half maximum of intensity distribution of outgoing light derived from incoming parallel light is not less than 0.7 degree and not more than 3.0 degree.

3. The light source device according to claim 1, wherein the diffusion plate has a micro lens array pattern or surface relief holographic pattern formed thereon.

4. The light source device according to claim 1, wherein the diffusion plate mixes the excitation light and the wavelength-converted light which are contained in the illumination light projected by the light projection section.

5. The light source device according to claim 1, wherein the light projection section is a projector lens, and the projector lens is provided so as to abut the diffusion plate.

6. The light source device according to claim 1, wherein the excitation light source is a semiconductor laser element or a light-emitting diode, and the excitation light is visible light emitted from the semiconductor laser element or the light-emitting diode.

7. The light source device according to claim 1, wherein the light-emitting section comprises a phosphor that receives the excitation light and then emits fluorescence, and the wavelength-converted light is fluorescence that is emitted from the phosphor excited by the excitation light.

8. A lighting device comprising:
a light source device according to claim 1.

9. A vehicular headlight comprising:
a light source device according to claim 1.

10. A vehicle comprising:
a vehicular headlight according to claim 9.

11. The light source device according to claim 1, wherein the diffusion plate is planar.

* * * * *